US007000969B2

(12) United States Patent
Baker et al.

(10) Patent No.: US 7,000,969 B2
(45) Date of Patent: Feb. 21, 2006

(54) INSTRUMENT PANEL WITH INTEGRATED HVAC AND ELECTRONIC SYSTEMS

(75) Inventors: Jay DeAvis Baker, West Bloomfield, MI (US); Myron Lemecha, Dearborn, MI (US); Jin Zhou, Troy, MI (US); Andrew Zachary Glovatsky, Plymouth, MI (US); Richard Keith McMillan, Dearborn, MI (US); Daniel Roger Vander Sluis, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/232,761

(22) Filed: Aug. 30, 2002

(65) Prior Publication Data

US 2004/0041432 A1 Mar. 4, 2004

(51) Int. Cl.
*B62D 25/14* (2006.01)

(52) U.S. Cl. ........................................ 296/70

(58) Field of Classification Search ................ 296/70, 296/72, 203.02, 202, 194; 180/90; 280/781, 280/792, 782; 454/69
See application file for complete search history.

(56) References Cited

U.S. PATENT DOCUMENTS

| | | | | |
|---|---|---|---|---|
| 4,391,465 A * | 7/1983 | Piano | 296/208 |
| 4,960,623 A * | 10/1990 | Levinson | 296/70 |
| 5,364,159 A * | 11/1994 | Kelman et al. | 296/70 |
| 5,706,170 A * | 1/1998 | Glovatsky et al. | 296/208 |
| 5,709,601 A * | 1/1998 | Heck | 296/70 |
| 5,715,140 A * | 2/1998 | Sinkunas et al. | 361/690 |
| 5,823,602 A * | 10/1998 | Kelman et al. | 296/70 |
| 5,979,965 A | 11/1999 | Nishijima et al. | |
| 6,073,987 A * | 6/2000 | Lindberg et al. | 296/70 |
| 6,203,092 B1 * | 3/2001 | Yoshinaka | 296/70 |
| 6,231,116 B1 * | 5/2001 | Naert et al. | 296/70 |
| 6,234,569 B1 * | 5/2001 | Derleth et al. | 296/70 |
| 6,250,706 B1 * | 6/2001 | Davis, Jr. et al. | 296/70 |
| 6,305,733 B1 * | 10/2001 | Rahmstorf et al. | 296/70 |
| 6,364,394 B1 * | 4/2002 | Davis, Jr. et al. | 296/70 |
| 6,409,590 B1 * | 6/2002 | Suzuki et al. | 296/70 |
| 2001/0008814 A1 | 7/2001 | Tsukamoto et al. | |
| 2002/0101093 A1 * | 8/2002 | Berteaux et al. | 296/70 |
| 2003/0094831 A1 * | 5/2003 | Kondo et al. | 296/70 |

FOREIGN PATENT DOCUMENTS

| | | | | |
|---|---|---|---|---|
| DE | 100 04 020 A1 | | 8/2000 | |
| DE | 100 39 576 A1 | | 2/2002 | |
| EP | 000607585 | * | 7/1994 | 296/70 |
| JP | 363219446 | * | 9/1988 | 296/70 |
| JP | 401190511 | * | 7/1989 | 180/90 |
| JP | 11-139181 | | 5/1999 | |

OTHER PUBLICATIONS

Copy of Examination Report for Application No. GB 0316937.2 dated Nov. 24, 2003.
Copy of German Search Report dated Jun. 2, 2005 for Application No. 103 39 182.7-21.

* cited by examiner

*Primary Examiner*—H. Gutman
(74) *Attorney, Agent, or Firm*—Brinks Hofer Gilson & Lione

(57) ABSTRACT

An automobile instrument panel assembly may be used in the cockpit of an automobile. The assembly includes a cross-car structure having a plurality of recesses and protrusions along the length of the structure and a plurality of generally planar surfaces. A plurality of HVAC components are adapted to closely fit within one or more of the plurality of recesses within the structure, and at least one flatwire bus is affixed to the generally planar surfaces of the structure.

15 Claims, 4 Drawing Sheets

INSTRUMENT PANEL WITH INTEGRATED HVAC AND ELECTRONIC SYSTEMS

BACKGROUND OF THE INVENTION

The present invention generally relates to an integrated automotive instrument panel. In particular, the present invention relates to an instrument panel assembly for the cockpit of an automobile comprised of a cross-car structure that integrates HVAC and flatwire and populated rigid or flexible flatboard electronics into a single integrated cockpit system. The structure provides rigidity and support to the vehicle, provides mechanical routing and anchoring of the electronic and HVAC components and provides heatsinking for the electronics attached to the cross-car structure.

Conventional instrument panel assemblies use a metal or plastic structure as a cross-car beam. Components that service the vehicle, such as the HVAC system or the radio control system, and the wiring associated with them, are packaged into boxes which are then attached to the beam. Specialized bracketry which must be welded or bolted onto the cross-car beam is required to attach the boxes to the cross-car beam. These boxes and the conventional round wires associated with them add cost to the assembly of the instrument panel and inefficiently use large amounts of space within the instrument panel assembly.

The present invention addresses these shortcomings by providing an advanced instrument panel assembly that uses a metal molded cross-car structure that integrates the HVAC system and instrument panel electronics into a single cockpit system.

BRIEF SUMMARY OF THE INVENTION

In one aspect of the present invention, an automobile instrument panel assembly for the cockpit of an automobile is provided. The assembly includes a cross-car structure spanning at least a portion of the cockpit for supporting the instrument panel. The structure defines a plurality of recesses and protrusions along the length of the structure and a plurality of generally planar surfaces. A plurality of HVAC components are adapted to closely fit within one or more of the plurality of recesses within the structure, and at least one flatwire bus is affixed to the generally planar surfaces of the structure. An instrument panel face is also affixed to at least a portion of the structure.

In another aspect of the present invention, a cross-car instrument panel support is provided. The support comprises an elongated beam comprising a bottom wall and a plurality of upstanding sidewalls. The sidewalls form at least one elongated channel extending along at least a portion of the elongated beam. The bottom wall is contoured to closely fit at least a portion of an HVAC housing, and the housing is adapted to hold a plurality of HVAC components. At least one of the upstanding sidewalls defines a plurality of planar surfaces. At least one of the planar surfaces is adapted to accept a flatwire bus along at least a portion of the length of the elongated beam.

In yet another aspect of the present invention, a method of supporting an instrument panel is provided. The method includes the steps of providing an elongated beam comprising a bottom wall and a plurality of upstanding sidewalls. The sidewalls form at least one elongated channel extending along at least a portion of the elongated beam. The bottom wall is contoured to closely fit at least a portion of an HVAC housing and at least one of the upstanding sidewalls defines a plurality of planar surfaces. At least one elongated flatwire bus having a plurality of takeouts is provided and attached to the elongated beam. A plurality of HVAC components is also attached within the HVAC housing, and an instrument panel face having a plurality of electronic features connectable to a takeout is attached to the elongated beam and one of the takeouts.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
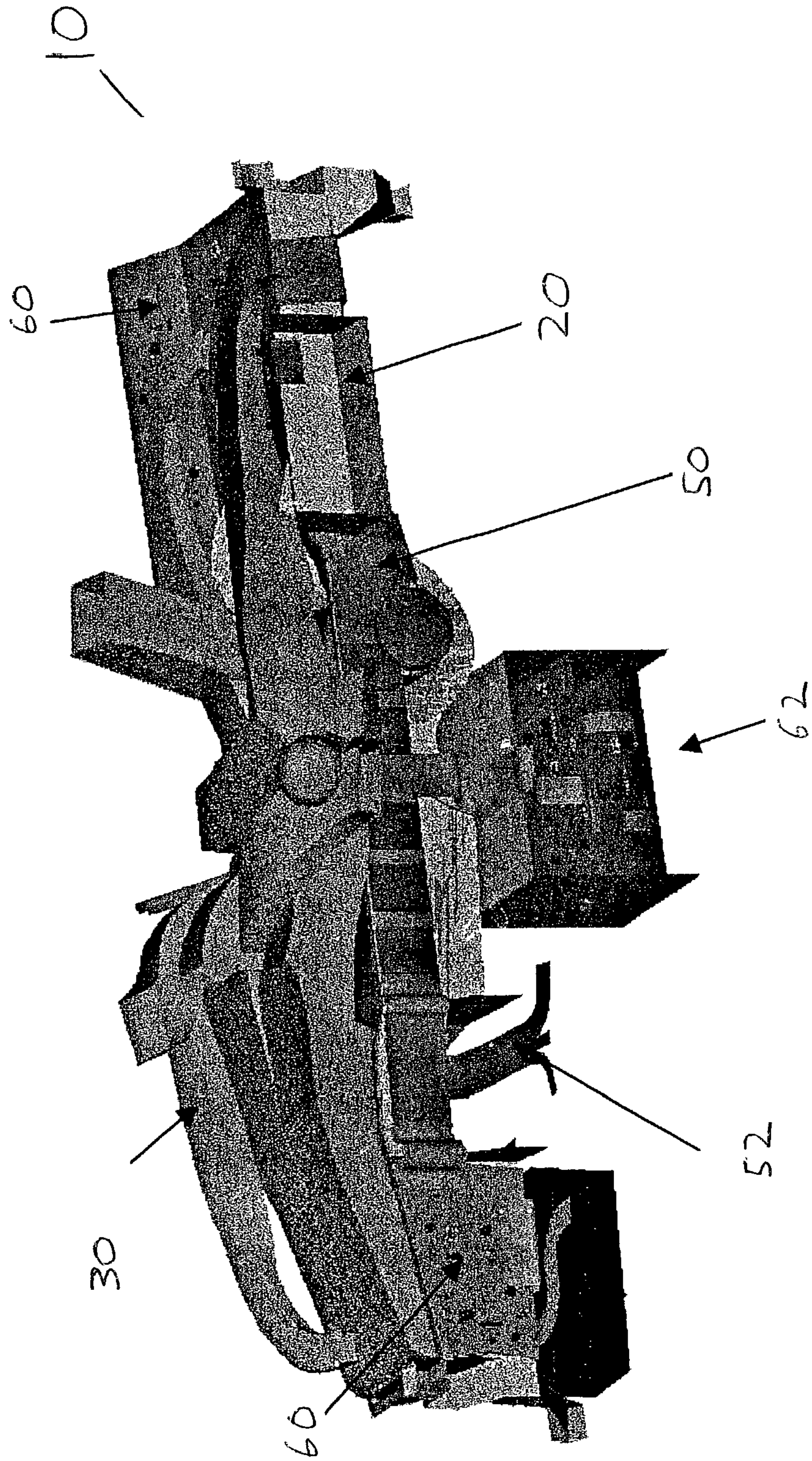
FIG. 1 is a perspective view of the integrated instrument panel assembly in accordance with a preferred embodiment of the present invention.
Figure 2:
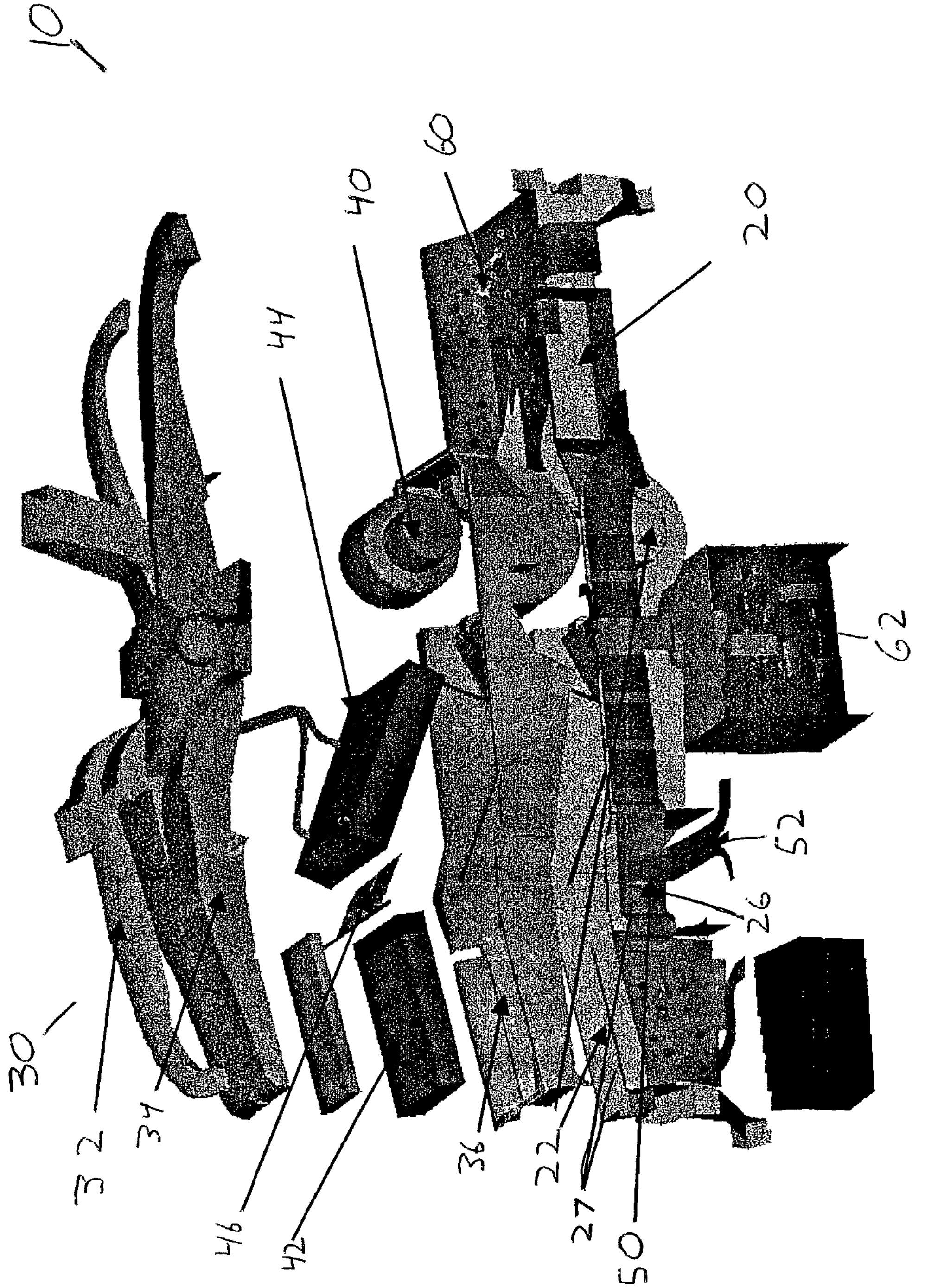
FIG. 2 is an exploded perspective view of the integrated instrument panel assembly in accordance with a preferred embodiment of the present invention.

FIGS. 1 and 2 show a first embodiment of an integrated instrument panel assembly 10 for the cockpit of an automobile. FIG. 1. shows the integrated instrument panel assembly 10 fully assembled. FIG. 2 shows the integrated instrument panel assembly 10 in an exploded view, in particular depicting the integrated instrument panel assembly's 10 various components. Referring to FIG. 2, the integrated instrument panel assembly 10 preferably comprises a cross-car structure 20, an HVAC assembly 30, a flatwire bus 50, and populated electronic sites 60. The populated electronic sites can be rigid circuit boards or electronic flexible substrates.

The cross-car structure 20 is preferably a one-piece elongated beam having at least partially a generally U-shaped cross section portion that forms an elongated channel 22 within the cross-car structure 20. The channel preferably comprises a bottom wall 26 and at least two upstanding side walls 27. Preferably, the upstanding walls define a plurality of generally planar surfaces 24, and the bottom wall 26 also forms a plurality of generally planar surfaces. The generally planar surfaces 24 accommodate the flatwire bus 50 and the populated electronic sites 60 and provide heatsink points for the flatwire circuitry. The generally planar surfaces 24 are not required to be completely flat. The surfaces may have some angle and/or curvature to them and will still accommodate flexible substrate circuitry.

The channel 22 defines a space that is adaptable to accommodate several major components that service the vehicle. As will be described in more detail below, the channel 22 is preferably adapted to receive HVAC components and, in one preferred embodiment, can act as the lower housing of the HVAC system. The cross-car structure 20 contains a plurality of structural ribs extending laterally across the structure to provide lateral structural support. The cross-car structure 20 also contains a plurality of recesses 23 and protrusions 25 along the length of the structure. The cross-car structure 20 preferably runs at least the entire width of the vehicle cockpit and connects the vehicle's A-pillars, providing rigidity to the vehicle and providing improved vibrational performance. The cross-car structure 20 may be rigidly connected to the rest of the body of the vehicle through weldments or bolts. The cross-car structure 20 is preferably made of magnesium for low weight applications, however the cross-car structure 20 may also be made of any high strength structural material such as steel or aluminum.

The HVAC assembly 30 for the integrated instrument panel assembly 10 preferably comprises HVAC ductwork 32, an HVAC upper housing 34 and an HVAC lower housing 36. The HVAC upper housing 34 and HVAC lower housing 36 mate to form an airtight HVAC housing and define an internal passage through which heated or cooled air passes. Within the internal passage, the HVAC assembly 30 further comprises components such as a blower swirl cage 40, a heater core 42, an evaporator 44 and a blend door 46. One or more HVAC components are adapted to closely fit within one or more recesses in the cross-car structure. Within the blower swirl cage 40 is a fan (not shown) for circulating air through the internal passage to the occupant compartment. The heater core 42 is comprised of a series of passages through which engine coolant passes. The heater core 42 becomes hot as the engine temperature rises and provides a source of heat for the HVAC system when heated air is desired. In contrast, the evaporator 44 provides a cooling source when chilled air is desired. The blend door 46 is controllable by the vehicle operator and is adapted to mix heated or cooled air within the internal passage until the desired air temperature in the passenger compartment is reached.

The channel 22 of the cross-car structure 20 is adapted to receive and support the HVAC lower housing 36, blower swirl cage 40, heater core 42, evaporator 44, and blend door 46. The bottom wall 26 and upstanding sides walls 27 are contoured to closely fit at least a portion of the HVAC housing. Although the embodiment depicted in FIGS. 1 and 2 shows the use of an HVAC lower housing 36, the lower housing can be eliminated from the integrated instrument panel assembly 10. According to this preferred embodiment, the HVAC upper housing 34 and cross-car structure 20 mate to form an airtight seal. The HVAC upper housing 34 and channel 22 form an internal passage through which air flows. In this embodiment, the cross-car structure 20 is adapted to directly receive and support the blower swirl cage 40, heater core 42, evaporator 44, and blend door 46.

Figure 3:
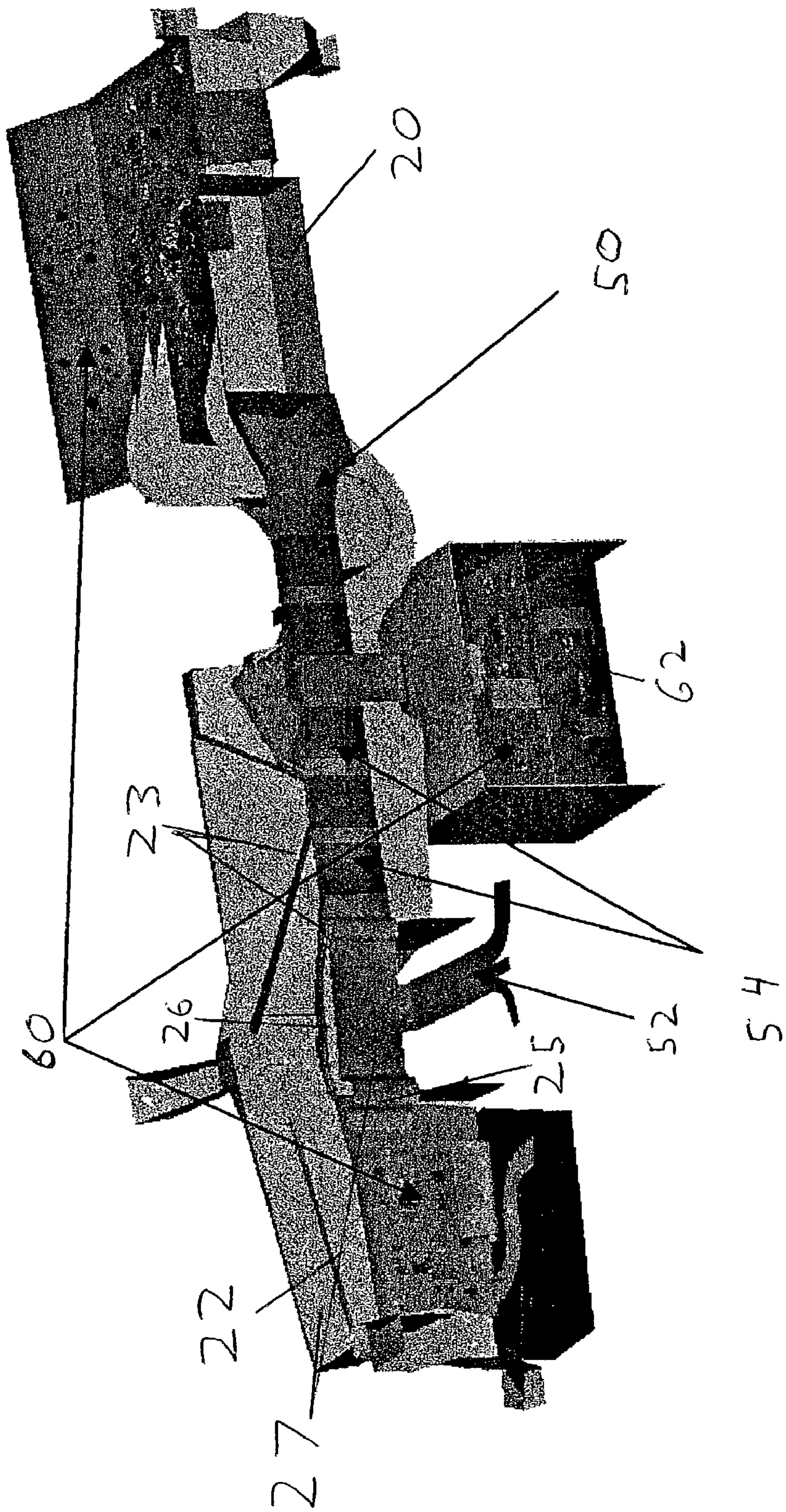
FIG. 3 is a perspective view of the upper surfaces of the cross-car structure depicting electrical component connections in accordance with a preferred embodiment of the present invention.
Figure 4:
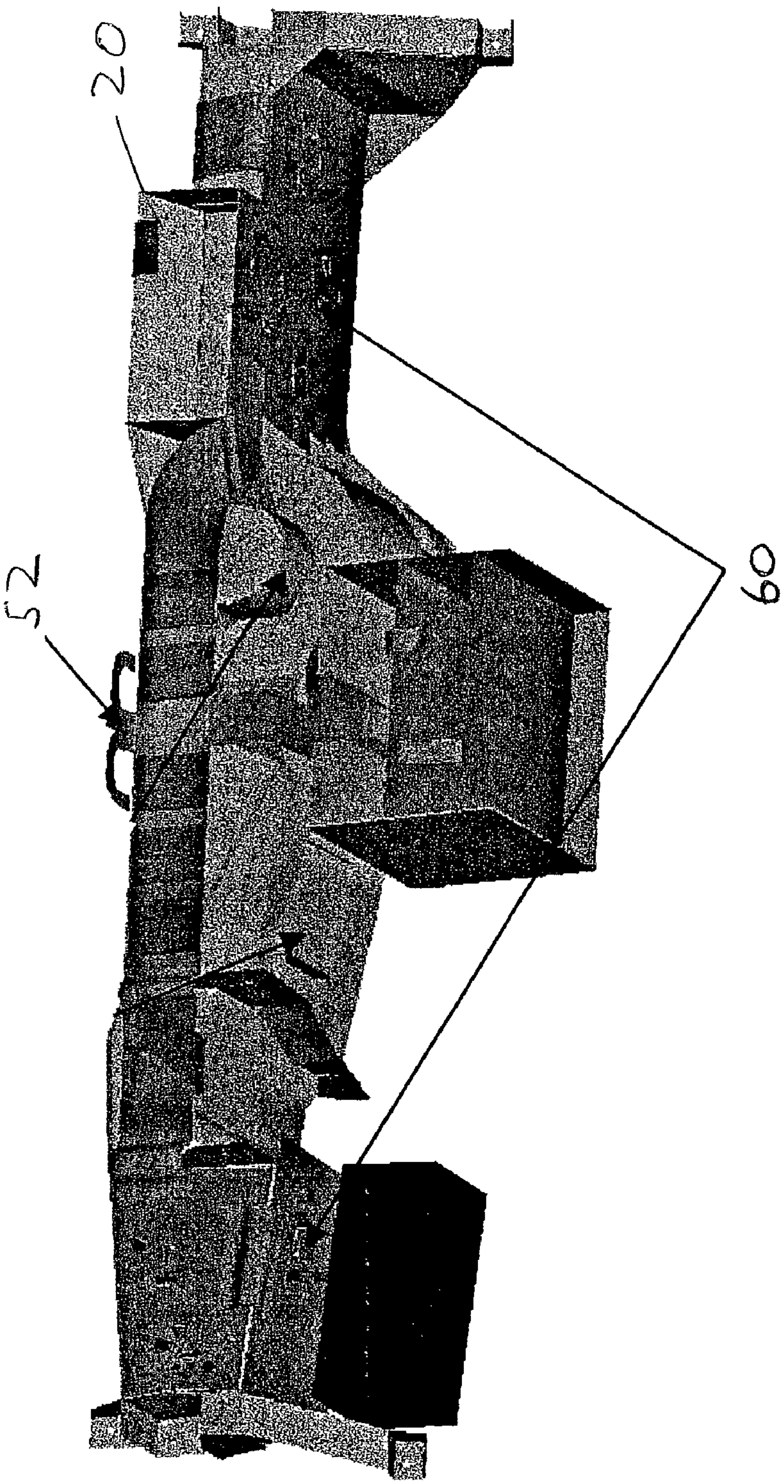
FIG. 4 is a perspective view of the lower surfaces of the cross-car structure depicting electrical component connections in accordance with a preferred embodiment of the present invention.

FIGS. 3 and 4 illustrate the manner in which electrical components are attached to the cross-car structure 20. As mentioned above, the cross-car structure 20 contains a plurality of planar surfaces 24 to which the flatwire bus 50 and populated electronic sites 60 attach. The flatwire bus 50 is preferably a flat copper wire or flat fiber optic cable mounted on a flexible polymer substrate. The flatwire bus 50 is preferably affixed to the cross-car structure 20 with an adhesive, metal screw or plastic fastener. The populated electronic sites 60 are bundles of electronic components used for controlling components of the vehicle such as a vehicle radio system. The flatwire bus 50 runs across the cross-car support 20 and provides electrical power and data to the populated electronic sites 60. The flatwire bus 50 and populated electronic sites 60 can be attached to or otherwise integrated with almost any planar surface on the cross-car structure 20. This flexibility creates an efficient use of the surfaces of the cross-car structure 20.

FIG. 3 shows an electrical connector takeout 52. Generally, the vehicle contains an instrument panel face 12 which acts as an interface between the vehicle operator and the electronic features of the vehicle. The instrument panel face contains buttons, knobs and switches to allow the vehicle operator to control HVAC, radio or navigation electronic features 14. The takeout 52 connects the flatwire bus 50 with at least one electronic feature mounted on the instrument panel face. FIG. 3 also discloses service sections 54 along the flatwire bus 50 that provide additional areas for electronic features on the instrument panel to connect to the flatwire bus 50.

A center stack area 62 may also be designed into the cross-car structure 20 to provide additional area for media such as radio, CD, navigation or internet display and climate controls. The center stack area may be connected to the flatwire bus 50 via a takeout.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. An automobile instrument panel assembly comprising:

a cross-car structure spanning at least a portion of a cockpit for supporting an instrument panel, said structure defining a plurality of recesses and protrusions along the length of said structure and a plurality of generally planar surfaces;

a plurality of HVAC components adapted to closely fit within one or more of said plurality of recesses within said structure;

at least one flatwire bus affixed to said generally planar surfaces of said structure;

at least one populated electronic site in thermal contact with an area of said generally planar surfaces and connected to said at least one flatwire bus; and an instrument panel face affixed to at least a portion of said structure wherein said instrument panel face further comprises a plurality of electronic features for electrical connection to said flatwire bus.

2. The assembly of claim 1 wherein said at least one flatwire bus is integrated into said structure.

3. The assembly of claim 1 wherein said structure further comprises a beam having a generally U-shaped cross section, said beam defining at least one elongated channel having a bottom wall and at least two upstanding sidewalls.

4. The assembly of claim 3 wherein said at least one flatwire bus is integrated into said bottom wall of said structure.

5. The assembly of claim 3 further comprising an upper and lower housing nested at least partially within said channel for housing one or more of said HVAC components.

6. The assembly of claim 8 wherein said one or more HVAC components are integrated into said elongated channel within said structure.

7. The assembly of claim 8 wherein said one or more HVAC components are selected from the group comprising an evaporator, a blower swirl cage, ductwork, a heater core.

8. The assembly of claim 1 wherein said structure further comprises magnesium.

9. The assembly of claim 1 further comprising at least one takeout to said bus.

10. A cross-car instrument panel support comprising:

an elongated beam having a generally U-shaped cross section comprising a bottom wall and a plurality of upstanding sidewalls, said sidewalls forming at least one elongated channel extending along at least a portion of said elongated beam;

said bottom wall being contoured to closely fit at least a portion of an HVAC housing, said housing adapted to hold a plurality of HVAC components; and at least one of said upstanding sidewalls defining a plurality of planar surfaces, wherein at least one flatwire bus is affixed to at least one of the planar surfaces and least one of said planar surfaces includes a populated electronic site integrating control of a plurality of electronic features.

11. The instrument panel support of claim 10 further comprising a centerstack area attached to said elongated beam, said center stack area including a connector for a takeout attached to said at least one flatwire bus.

12. The instrument panel support of claim 10 wherein said HVAC housing further comprises at least an upper housing and a lower housing.

13. The instrument panel support of claim 12 wherein said housing is contoured to fit said plurality of HVAC components.

14. The instrument panel support of claim 10 wherein said plurality of HVAC components are selected from the group comprising an evaporator, a blower swirl cage, ductwork, and a heater core.

15. A method of supporting an instrument panel, said method comprising the steps of:

providing an elongated beam comprising a bottom wall and a plurality of upstanding sidewalls, said sidewalls forming at least one elongated channel extending along at least a portion of said elongated beam, said bottom wall being contoured to closely fit at least a portion of an HVAC housing and at least one of said upstanding sidewalls defining a plurality of planar surfaces;

providing at least one elongated flatwire bus having a plurality of takeouts;

attaching said bus onto said elongated beam;

attaching a plurality of HVAC components within said HVAC housing;

providing an instrument panel face having a plurality of electronic features connectable to at least one of said takeouts; and attaching said instrument panel face to said elongated beam at least one of said takeouts.

* * * * *